United States Patent [19]

Evers

[11] Patent Number: 5,044,689
[45] Date of Patent: Sep. 3, 1991

[54] TRUCK VAN CLOSURE HAVING IMPROVED ACCESS MEANS

[76] Inventor: Ande Evers, 1600 Huntingdon Trail Dr., Atlanta, Ga. 30350

[21] Appl. No.: 654,241

[22] Filed: Feb. 12, 1991

[51] Int. Cl.⁵ ............................................. B60J 5/06
[52] U.S. Cl. .................................... 296/183; 296/181; 220/1.5; 220/9.1
[58] Field of Search ............... 296/181, 183, 138, 142; 220/1.5, 9.1

[56] References Cited

U.S. PATENT DOCUMENTS

| | | | |
|---|---|---|---|
| 3,709,552 | 1/1973 | Broadbent | 296/183 |
| 4,545,611 | 10/1985 | Broadbent | 296/181 |
| 4,700,985 | 10/1987 | Whitehead | 296/181 |
| 4,844,524 | 7/1989 | Pastva | 296/181 |
| 4,943,110 | 7/1990 | Pastva | 296/181 |
| 4,952,009 | 8/1990 | Mountz et al. | 296/181 |

Primary Examiner—Robert R. Song
Attorney, Agent, or Firm—Rodgers & Rodgers

[57] ABSTRACT

A truck van includes a floor bed, vertical corner posts projecting upwardly from the floor bed, a front wall secured to the front corner posts, a roof mounted atop the posts, vertical rollers mounted adjacent the corner posts, an endless web disposed about the rollers and in snug contact therewith, an access aperture formed in the web and arranged to afford access to the interior of the van from the rear or from either side thereof.

16 Claims, 2 Drawing Sheets

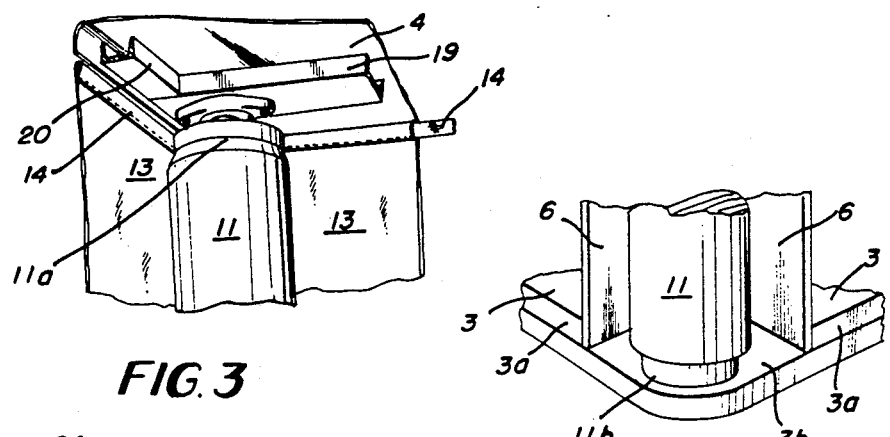
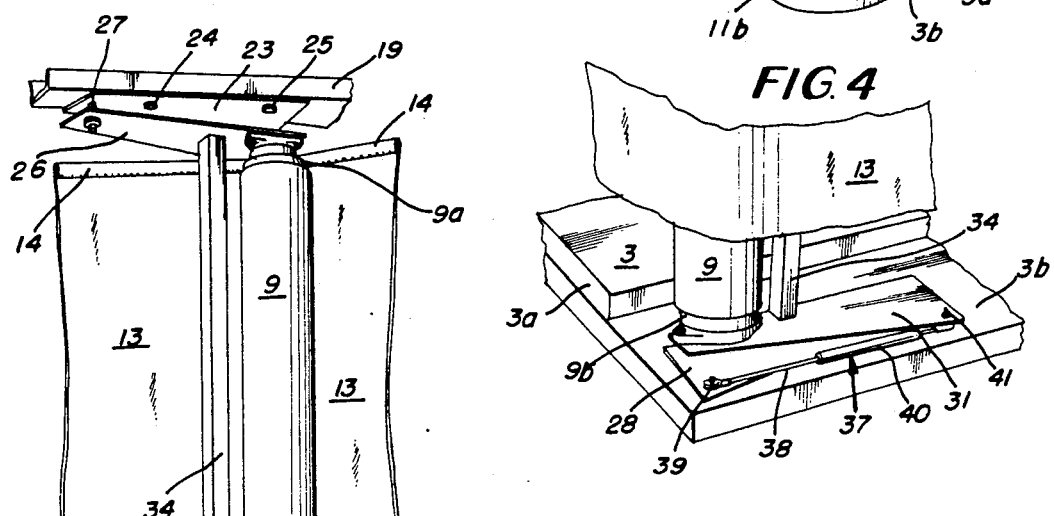
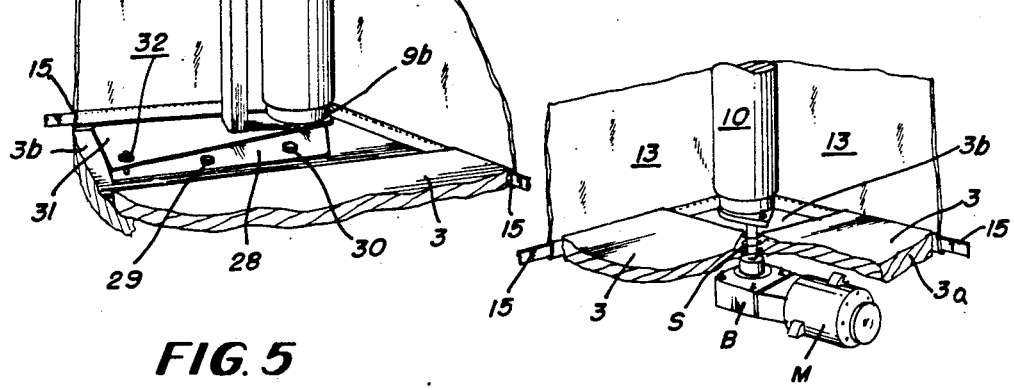

TRUCK VAN CLOSURE HAVING IMPROVED ACCESS MEANS

TECHNICAL FIELD

This invention relates to closure means for a truck van having a movable closure web having an access opening which is positionable on the rear or on either side of the truck to facilitate loading and unloading the truck, the web aperture being disposed at the front of the van in order to effect closure thereof.

BACKGROUND ART

U.S. Pat. No. 3,709,552 issued Jan. 9, 1973 discloses a truck van having an open side which is closable by a slidable curtain suspended from the roof of the van body.

U.S. Pat. No. 4,545,611 issued Oct. 8, 1985 discloses a van body having pleated sides which afford side openings which are closable by slidable door structure consisting of two solid end doors interconnected and bridged by a foldable curtain.

U.S. Pat. No. 4,844,524 issued July 4, 1989 discloses a truck trailer closure assembly for tensioning a flexible curtain over an opening which includes a shaft with a vertical axis together with bearing members rotatably connecting the shaft to the truck trailer.

SUMMARY OF THE INVENTION

According to this invention in one form, a truck van is provided having a floor bed together with a plurality of corner rollers supported by the floor bed and having vertically disposed axes, an endless web disposed about the rollers and in snug close contact therewith, an access aperture formed in the web and means for imparting bodily movement to the web about the rollers so as selectively to locate the access aperture at the front, rear or either side of the truck van.

BRIEF DESCRIPTION OF THE DRAWINGS

In the drawings,

FIGS. 3, 4, 5, 6 and 7 are perspective views of detailed features forming parts of this invention.

BEST MODE OF CARRYING OUT THE INVENTION

Figure 1:
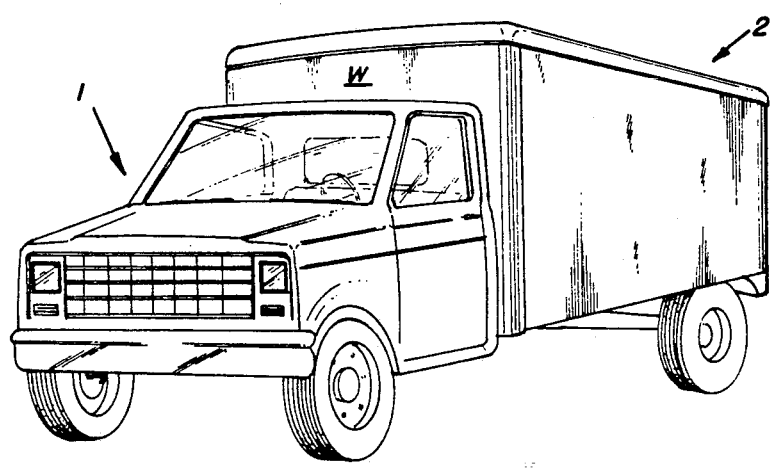
FIG. 1 is a perspective view of a truck and its associated van to which this invention is applicable.
Figure 2:
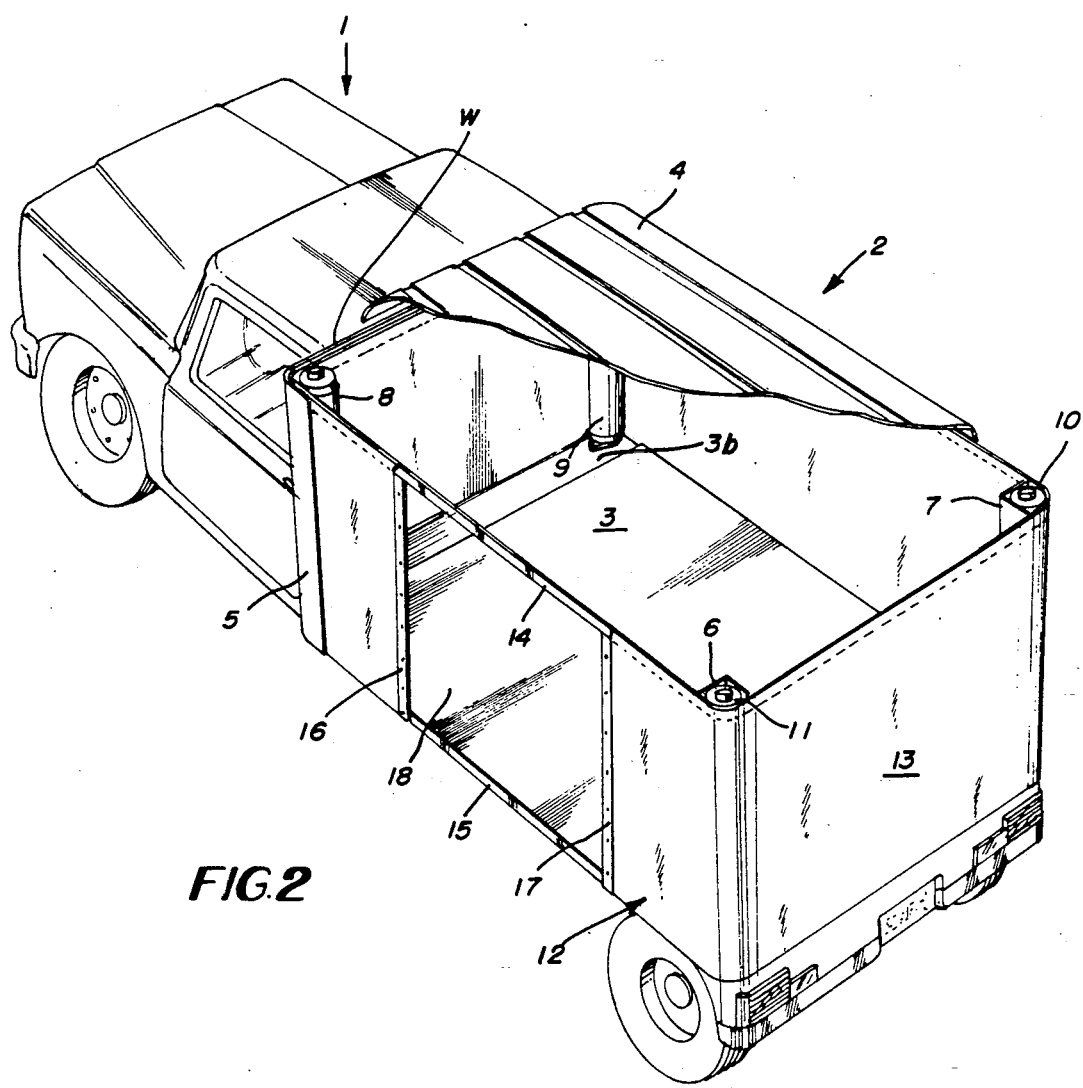
FIG. 2 is a view similar to FIG. 1 but with parts of the van broken away and which is taken from a different vantage point.

In FIGS. 1 and 2, the numeral 1 designates the cab of a conventional truck and the numeral 2 generally designates the associated truck van.

With reference to FIG. 2, the numeral 3 designates the floor bed and the numeral 4 designates the van roof. Of course the structure of FIGS. 1 and 2 is mounted atop a conventional chassis frame which is not shown in the drawings. A corner post 5 is vertically disposed and is mounted atop the floor bed 3. A similar corner post on the opposite side of the structure is provided but is not observable in the drawings. A front wall W is secured to corner post 5 and to the opposite post not observable in FIG. 2 and extends from floor 3 to roof 4. At the rear of the van, a pair of corner posts 6 and 7 are provided and like corner post 5 are mounted atop the floor bed 3 and are vertically disposed.

Closure structure for the van includes corner rollers 8, 9, 10 and 11 about which an endless movable web 12 is disposed in snug closely fitting engagement. The endless web 12 comprises a curtain 13 secured along its upper edge to an upper belt 14 and secured along its lower edge to a lower belt 15 which is below the level of floor bed 3. A sub floor 3b underlies the upper floor 3 and serves to support rollers 8-11 and other associated structure. Contact between lower belt 15 and the lower ends of rollers 8-11 is thus facilitated. The spaced end edges 16 and 17 of the curtain 13 define an access aperture which may be disposed on either side of the van or at the rear thereof so as to afford access to the interior. When the access aperture 18 is disposed at the front of the van and immediately adjacent and in close juxtaposition to the front wall W behind cab 1, the van is effectively closed.

With reference to FIG. 3, the roof 4 of the van is supported by a support frame which may be formed of channels such as 19 and 20 which are secured at adjacent ends to define corners of the van and which are supported by the corner posts such as 5, 6, 7 and the other post opposite post 5.

The roller 11 is shown in enlarged views 3 and 4. FIG. 3 shows the upper end of roller 11 while FIG. 4 shows the lower end of that roller. A recess 11a is formed at the upper end of roller 11 and conveniently cooperates with the endless upper belt 14 while a peripheral recess 11b is formed at the lower end of roller 11 and cooperates with the endless lower belt 15.

For the purpose of maintaining adequate tension in the endless web 12, the structure such as is shown in FIG. 5 may be used. Toward this end, a base plate such as 23 may be secured as by bolts 24 and 25 to channel 19 and a movable tensioning plate 26 may be pivotally mounted on base plate 23 at pivot 27. The upper end of roller 9 is journalled by conventional journal structure in the right hand end of tensioning plate 26. Interconnected with the lower end of roller 9 is a base plate 28 secured by bolts 29 and 30 to floor bed 3b. A tensioning plate 31 is pivotally connected with base plate 28 by a pin 32. The lower end of roller 9 is journally mounted for rotation in a conventional journal bearing in tensioning plate 31 and is not shown in the drawings.

In order to insure that the roller 9 is maintained in a vertical orientation, a connecting bar 34 is fixedly secured as by welding at its upper end to tensioning plate 26 and at its lower end to tensioning plate 31.

In order to impart tensioning force to the endless web, the structure shown in FIG. 6 may be employed and may include a piston cylinder structure generally designated at 37. The piston rod 38 is pivotally connected to base plate 28 by a pin 39 and the end of cylinder 40 is pivoted at pin 41 to tensioning plate 31. Thus operation of piston cylinder device 37 imparts swinging movement to the tensioning plate 31 and to roller 9 thereby to control the tension of the endless web 12. Obviously the tensioning structure may be applied to one or more of the rollers as may be desired.

For the purpose of imparting bodily movement to the endless web 12, motor means such as is indicated in FIG. 7 by the electric motor M and its associated bearing structure B imparts rotary movement to the shaft S which is rigidly secured to roller 10. As shown in FIG. 7 the motor M and its associated bearing B are disposed below the sub floor bed 3b. Also the roller 10 could be an idler and the endless web 12 could be moved inwardly.

Obviously operation of motor M and its associated bearing B imparts rotary movement to the roller such as 10. This rotary movement imparts bodily movement to the endless web 12 so that the access aperture 18 may be located at the left, right or rear of the van 2 as may be desired depending on local circumstances thereby to facilitate loading and unloading of the van. If desired the web 12 may be moved manually instead of by motor M.

Since the roof 4 overlies the endless web 12 as well as the corner posts such as 5, 6, 7, and the corner post opposite post 5 and not showing and the rollers such as 8, 9, 10 and 11, the loaded contents of the van are protected against precipitation. While easy access to the interior of the van is provided for loading and unloading purposes, the security of the van is also provided by simply moving the endless web 12 so that the access opening 18 is disposed immediately adjacent and in close juxtaposition to the rear of the front wall W of van 2 and immediately behind cabin 1.

While the invention as described above is applicable to a truck van, it is not limited to such a device and could constitute a cubicle having a quadrilateral floor bed, a plurality of rollers mounted respectively at the corners of said floor bed and having vertically disposed axes, an endless web disposed about said rollers and in snug close contact therewith, an access aperture formed in said web, means for imparting bodily movement to said web about said rollers so as selectively to locate said access aperture at the front, rear or at either side of said cubicle and suitable lifting devices such as hooks for cooperating with an overhead crane or a pallet style base for cooperating with a fork lift truck or the like.

I claim:

1. A truck van comprising a quadrilateral floor bed, a plurality of rollers mounted respectively at the corners of said floor bed and having vertically disposed axes, an endless web disposed about said rollers and in snug close contact therewith, an access aperture formed in said web, and means for imparting bodily movement to said web about said rollers so as selectively to locate said access aperture at the front, rear or at either side of said truck van.

2. A truck van according to claim 1 wherein said endless web comprises a curtain and an endless upper and an endless lower belt secured respectively to the upper and lower edges of said curtain.

3. A truck van according to claim 1 wherein some of said rollers are idlers and at least one of said rollers is a drive roller.

4. A truck van according to claim 1 wherein web tensioning means is associated with at least some of said rollers for imparting limited web tensioning movement thereto.

5. A truck van according to claim 4 wherein each of said web tensioning means includes upper and lower devices associated respectively with the upper and lower ends of at least some of said rollers and wherein each of said upper and said lower devices which are associated with at least some of said rollers are fixedly interconnected by a connecting bar for movement in unison.

6. A truck van according to claim 2 wherein the upper and lower end portions of said rollers are of slightly reduced diameter for receiving said upper and said lower belts respectively.

7. A truck van comprising a floor, front wall, bed, vertical corner posts projecting upwardly from said floor bed, a roof mounted atop said posts, vertical rollers mounted adjacent to said corner posts, an endless web disposed about said rollers and in snug contact therewith, an access aperture formed in said web and arranged to afford access to the interior of said van from the rear or from either side thereof.

8. A truck van according to claim 7 wherein said roof overlies said rollers and said web.

9. A truck van according to claim 2 wherein said endless lower belt is disposed at a level below said floor bed.

10. A truck van according to claim 2 wherein the spaced apart end edges of said curtain define the side edges of said access aperture.

11. A truck van according to claim 1 wherein said truck van is effectively closed when said access aperture is disposed at the front of said truck van and in close juxtaposition to the front wall of the van and the associated truck cab.

12. A truck van according to claim 7 wherein said vertical corner posts are of angle bar construction.

13. A truck van according to claim 12 wherein said vertical corner posts which are disposed at the front of the van are outside said endless web and wherein said vertical corner posts which are disposed at the rear of the van are inside said endless web and in partial enveloping relation respectively with the adjacent roller.

14. A truck van according to claim 1 wherein bodily movement is imparted to said web by an electric motor and associated gear.

15. A truck van according to claim 1 wherein said web is moved manually.

16. A cubicle comprising a quadrilateral floor bed, a plurality of rollers mounted respectively at the corners of said floor bed and having vertically disposed axes, an endless web disposed about said rollers and in snug close contact therewith, an access aperture formed in said web and means for imparting bodily movement to said web about said rollers so as selectively to locate said access aperture at the front, rear or at either side of said cubicle, and means to facilitate lifting and transporting said cubicle.

* * * * *